Aug. 19, 1958 O. J. ALLEN 2,848,686

HIGH LEVEL A. M. MODULATION

Filed April 20, 1955

INVENTOR.

Ollie James Allen

BY: Olson & Trexler

Attys.

United States Patent Office 2,848,686

Patented Aug. 19, 1958

2,848,686

HIGH LEVEL A. M. MODULATION

Ollie James Allen, Lincroft, N. J.

Application April 20, 1955, Serial No. 502,553

8 Claims. (Cl. 332—38)

This invention is concerned with the art of radio broadcasting, and more particularly with high level A. M. modulation.

In conventional low level modulation the carrier is modulated at a low power level and then is amplified with Class "B" or high efficiency linear amplification to the desired power level for transmission. The modulator need furnish side-band power that is only a fraction of the full side-band power output of the transmitter. However, the amplifiers for the modulator wave must be linear, either Class "B" R. F. amplifiers or high efficiency linear amplifiers of special design. High level modulation often is resorted to, and in this method of modulation the carrier is modulated at high power levels in the final stage or power amplifier. The necessity of a large number of Class "B" R. F. amplifiers thus is obviated. However, the audio power output of the modulator must be equal to one half of the D. C. power input of the modulated amplifier for one hundred per cent modulation at an efficiency equal to that at which the carrier output is produced by the modulated amplifier. Heretofore, various expedients such as clipping, suppression, compression, filtering, et cetera of the audio have been necessary to prevent overmodulation.

It is an object of this invention to provide an A. M. transmitter circuit obviating the necessity of the foregoing audio treating expedients.

It is a further object of this invention to provide an A. M. transmitter eliminating the limits imposed by conventional modulation and rendering it possible to modulate any carrier with as much audio as is possible for a transmitter to generate without overmodulating.

Yet another object of this invention is to provide an A. M. transmitter circuit wherein the positive modulation can be substantially greater than one hundred per cent, but the negative modulation is limited to less than one hundred per cent.

Yet another object of this invention is to provide an A. M. transmitter circuit for high level modulation wherein the efficiency of a single side-band carrier can be obtained.

It is a specific object of this invention to provide a high level A. M. modulation circuit employing an electronic switch precluding one hundred per cent negative modulation while allowing substantially unlimited positive modulation.

More specifically, it is an object of this invention to provide a high level A. M. modulation circuit employing an electronic switch for limiting negative modulation wherein all operational transients are eliminated.

Other and further objects and advantages of the present invention will be apparent from the following description when taken in connection with the accompanying drawings, wherein.

Figures 1, 2, 3:
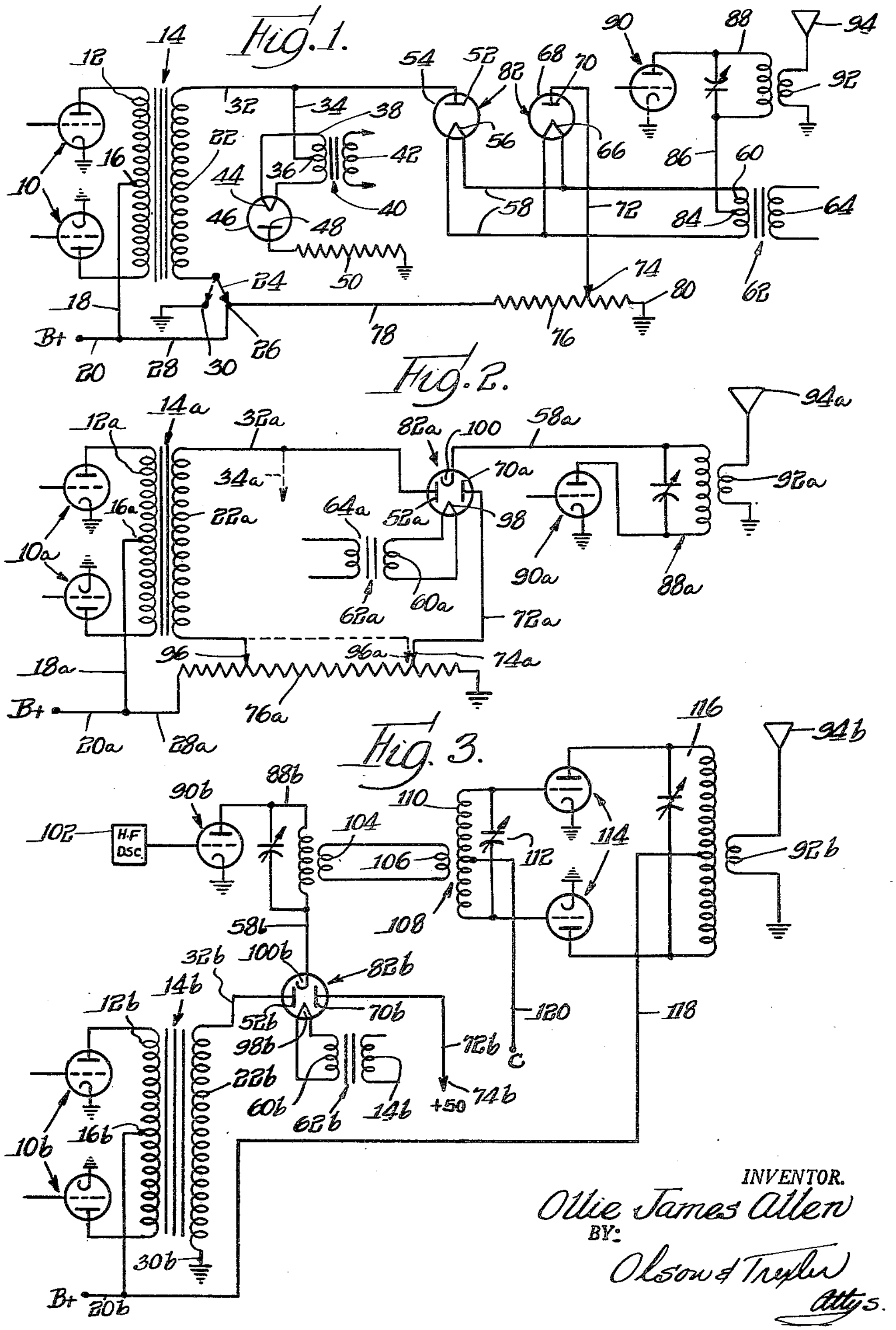
Fig. 1 represents a preferred form of my high level A. M. modulation circuit.
Fig. 2 is a schematic wiring diagram illustrating a modification of Fig. 1.
Fig. 3 is another schematic wiring diagram illustrating yet another modification.

Throughout the following description and in the accompanying drawings detail as to conventional parts has been kept at a minimum to preclude obscuring the essentials of the invention. Thus, in Fig. 1 the output stage of a modulating transformer is indicated generally by a pair of push-pull output tubes 10 having their plates connected to the primary winding 12 of a modulation transformer 14. The tubes are illustrated simply as triodes, but it will be understood that any other type of tubes suitable for the purpose could be used. The transformer primary winding 12 is provided with a center tap at 16 in accordance with conventional practice, and this center tap is connected by means of wires 18 and 20 to any suitable source of B+ voltage for supplying D. C. plate power to the tubes 10.

The secondary winding 22 of the modulation transformer is connected at one end to the moving arm of a switch 24 for alternately connecting the end of the secondary winding to a high voltage contact 26 connected by a wire 28 to the B+ wire 20, or to a grounded tap 30. The opposite end of the secondary 22 is connected to a wire 32. A wire 34 is connected to the wire 32 and to the center tap 36 of the secondary winding 38 of a filament transformer 40. The primary winding 42 is connected to a source of 110-volt A. C. potential. The ends of the secondary 38 are connected to the heater-cathode 44 of a diode rectifier tube 46. The plate 48 of the diode 46 is connected through a load resistor 50 to ground.

The wire 32 also is connected to the plate 52 of a diode switch tube 54. The heater-cathode 56 of this tube is connected by a pair of wires 58 to the opposite ends of the secondary 60 of a filament transformer 62, the primary winding 64 of this transformer being connected to a suitable source of 110-volt A. C. potential. The heater-cathode 66 of a second diode switch tube 68 is connected to the wires 58. Hence, the heater-cathodes 56 and 66 are connected in parallel with one another and are maintained at the same potential. The plate 70 of the tube 68 is connected by means of a wire 72 to a sliding tap 74 on a potentiometer resistor 76. The high side of the potentiometer resistor is connected by means of a wire 78 to the high voltage tap 26, while the low side is connected to ground at 80.

The two diode switch tubes 54 and 68 together form an electronic switch 82, and it will be understood that the two tubes 54 and 68 could comprise the two diode sections of a duodiode or full wave rectifier tube. The primary winding 60 of the filament transformer 62 is center tapped at 84, and the center tap is connected by means of a wire 86 to the tuned circuit 88 of a Class "C" R. F. power amplifier indicated generally at 90. The tuned circuit is inductively coupled at 92 to an antenna conventionally indicated at 94.

There are two sources of high voltage potential for the power amplifier 90 when the switch 24 is in its normal position of operation contacting the tap 26. Thus, there is a circuit connected from B+ to wires 20 and 28, tap 26 and switch 24, modulation transformer secondary 22, wire 32, diode tube section 54, filament transformer primary 60 and center tap 84, wire 86 and tuned circuit 88. This connection is for normal operation, and when the modulating amplifier tubes 10 are operated, a modulation signal is imposed on the high D. C. voltage and modulates the carrier from the tube 90 so that a modulated carrier is transmitted from the antenna 94.

There is a second source of D. C. voltage for the power amplifier 90. This source is from the sliding tap 74 on the potentiometer 76, and necessarily varies with the position of the sliding tap. From the sliding tap 74 the circuit goes through the wire 72, the rectifier tube 68, and wires 58 to the filament transformer secondary 60, and hence through the center tap 84 and wire 86 to the tuned circuit 88. For illustrative purposes it might be assumed that the sliding tap 74 is set at such a position as to be at 50 volts D. C. potential.

When the modulating voltage from the transformer 14 acts as positive modulation, the voltage will be superimposed on the high D. C. voltage and will pass through the circuit including the diode rectifier 54 to the power amplifier. The magnitude of the voltage can be extremely great, and can be at any level within the limitations of the circuit components. A half cycle later when the modulation swings negative, the modulating voltage will tend to drive the plate voltage of the amplifier tube 90 to zero or less if the percentage of modulation is one hundred per cent or higher. However, once the voltage on the wire 32 reaches 50 volts or less, the rectifier tube 54 will stop conducting due to the 50 volts maintained on the plate 70 of the other diode rectifier which insures a potential of 50 volts D. C. maintained on the wires 58 at all times. Thus, the D. C. is supplied through the rectifier tube 68 and limits the minimum D. C. voltage applied to the power amplifier tube 90 to 50 volts, or whatever value may be picked off by the sliding tap 74. As a result, the positive modulation can be well over one hundred percent, but the negative modulation cannot exceed one hundred percent, and indeed cannot reach one hundred percent as long as the sliding tap 74 is positioned above ground potential.

The resistor 50 is equal to the resistive load of the R. F. load imposed on the modulation transformer, and once the potential on the wire 32 drops below ground potential on the negative half cycle of modulation, the tube 46 will conduct, and the resistor 50 thus will be connected to the modulation transformer secondary in place of the R. F. load. Thus, the modulation transformer will "see" the same load at all times. The transformer 14 thus assumes a linear characteristic on both positive and negative half cycles of modulation to hold distortion to a minimum and substantially to eliminate switching transients.

To operate on high level A. M. operation with a reduced carrier, the switch 24 is moved to the contact 30. The lower end of the modulation transformer secondary therefore is connected to ground. Without modulation, there is no voltage on the tube 54. Therefore, tube 68 conducts and provides a positive holding voltage to the Class "C" R. F. amplifier 90, thus providing a minimum carrier. With modulation present the tube 54 conducts on positive half cycles to provide a high level carrier, releasing the tube 68 from the R. F. load on the positive half cycle. On the negative half cycles, the R. F. load is released from the modulation transformer 14 and is picked up by the tube 68, the modulation transformer at the same time picking up the resistor 50 through conduction of the tube 46 in the manner previously indicated.

A modification of the invention is shown in Fig. 2. The parts and the functions thereof are by and large the same as those in Fig. 1, and similar parts are identified by similar numerals with the addition of the suffix *a*. Extended description of the corresponding parts therefore is believed to be unnecessary. The major difference between the embodiment of Fig. 2 and that of Fig. 1 is that the lower end of the modulation transformer secondary 22*a* is connected to a sliding tap 96 on the potentiometer resistor 76*a*. The electronic switch 82*a* comprises two halves of a duodiode, the plates being indicated at 52*a* and 70*a*, and the heater being indicated at 98 and the cathode at 100. The plate 52*a* is shown as connected by the wire 32*a* to the top of the secondary 22*a* of the modulation transformer 14*a*. The plate 70*a* is connected by the wire 72*a* to the sliding tap 74*a* as brought out before to hold a minimum amount of carrier at all times. The filament 98 is connected to the secondary winding 60*a* of the filament transformer 62*a*, and the cathode 100 is connected by means of the wire 58*a* directly to the tuned circuit 88*a* of the power amplifier 90*a*. The wire 34*a* is indicated in phantom as connected to the wire 32*a* showing that the resistor 50 and associated diode 46 could be included in the circuit, but is not necessary to illustrate the principles of the modification.

The sliding tap 96 connected to the lower end of the modulation transformer secondary provides a means for setting the carrier level to a given amount, this being done before the modulation is applied to bring the average level of carrier up to the desired amount. This gives, in effect, a controlled carrier. The position of the sliding tap 96 on the voltage divider or potentiometer 76*a* determines the amount of maximum carrier before modulation, while the sliding tap 74*a* as previously noted serves to hold a minimum amount of carrier at all times. When the sliding tap 96 is moved into coincidence with the tap 74*a* as is indicated in dashed lines, or nearer to the ground position than the sliding tap 74*a*, the sliding tap 74*a* determines the maximum holding carrier without modulation. The result is that only a single side band is generated, and the circuit has the efficiency of a single side band carrier.

A further embodiment of the invention is shown in Fig. 3. Many of the parts are the same as heretofore have been discussed, and to save needless description the similar parts are identified by similar numerals with the addition of the suffix *b*. The input to the modulation transformer 14*b* is the same as previously has been discussed. The secondary winding 22*b* has the lower end thereof directly grounded at 30*b* and the upper end is connected by means of the wire 32*b* to one of the plates 52*b* of a duodiode forming the electronic switch 82*b*. The other plate 70*b* is connected by means of a wire 72*b* to the tap 74*b* or to some other source of positive voltage, 50 volts being chosen as being illustrative. The heater 98*b* again is energized by means of a filament transformer 62*b*, and the cathode 100*b* is connected by means of a wire 58*b* to a tuned circuit 88*b* of a power amplifier 90*b*. In the present instance the power amplifier 90*b* is an intermediate power amplifier rather than an output power amplifier. A high frequency oscillator is shown at 102 for driving the amplifier 90*b*.

The tuned circuit 88*b* is inductively coupled at 104 to a transmission line which is coupled by means of a transformer 108 to an R. F. Class "B" linear power amplifier. The transmission line is connected directly to the primary winding 106 of the transformer 108, and the secondary winding 110 is connected to drive the Class "B" power amplifier tubes 114. A variable condenser 112 is connected across the secondary 110 to tune the same. The output of the Class "B" amplifiers 114 is connected to a tuned circuit 116 which is provided with B+ potential by means of a wire 118 leading back to the wire 20*b*. It will be noted that the secondary 110 of the transformer 108 is center tapped and is provided with a wire 120 leading to a source of biasing potential indicated at C. The tuned circuit 116 is coupled at 92*b* to the antenna 94*b*.

The embodiment just described modulates a low power R. F. stage which drives an R. F. Class "B" linear power amplifier. This circuit has the advantage that a small modulator is used, a highly efficient power amplifier is employed and the efficiency of a single side band is obtained by virtue of the grounded modulation transformer secondary 22*b* which in connection with the electronic switch 82*b* prevents any negative modulation. As many R. F. Class "B" linear stages as are needed to bring the output power level to the required amount may be employed.

In all of the embodiments of the invention described above it will be apparent that the electronic switch automatically causes the modulation transformer to be connected to a carrier stage for modulating the carrier whenever the modulating voltage is on its positive half cycle and automatically effects disconnection of the modulation transformer from the carrier stage and substitution therefor of the holding voltage whenever the negative half cycle of the modulation voltage drops below a predetermined minimum. Thus, the positive modulation may run well over one hundred percent, while the negative modulation simultaneously is limited to one hundred percent or less as is determined by the holding voltage. The negative modulation may be greatly reduced so that a predominant side band is generated approaching the efficiency of a single side band carrier.

The tube or tubes use in the electronic switch preferably are of the high vacuum type so that the transition of the R. F. load from one voltage supply to the other is resistive. However, it has been found that operation is satisfactory with gas type rectifier tubes. In modifications of the circuit wherein the rectifier tube 46 and resistor 50 are omitted, the Class "B" modulator tubes work into different loads. Therefore, it is possible in such instances to reduce the size of the tube handling the negative portion of modulation. In practice it has been found that the negative tube could be eliminated entirely from the circuit, letting the back E. M. F. or "flywheel" effect of the transformer handle the ninety-five percent negative modulation.

The only limit on the percentage of modulation that can be accomplished by the various circuits heretofore shown and described is the limitations of the tubes and electrical components themselves. It is possible to modulate any carrier with as much audio as it is possible for a transmitter to generate without overmodulating.

The circuits herein shown and described can be incorporated into any A. M. transmitter to provide maximum audio within the capabilities of the transmitter audio system without overmodulation. It will increase the range, coverage and usable power of any transmitting station. The circuit will find use in commercial broadcasting, amateur radio, aircraft radio, industrial radio, and countless other applications far too numerous to mention.

In the ensuing claims certain abbreviations well known in the electrical arts are used in their normal senses. Thus, "A. M." is to be read as "amplitude modulation," and "D. C." is to be read as "direct current."

The specific embodiments of the invention herein shown and described will be understood as being by way of illustration only. Various changes in the specific circuits shown and described will no doubt occur to those skilled in the art, and will be understood as forming a part of my invention insofar as they fall within the spirit and scope of the appended claims.

The invention is claimed as follows:

1. An A. M. modulation circuit comprising a carrier amplifier stage having an input connection for a modulating voltage, a source of alternate relatively positive and negative modulating voltage, a source of positive bias potential, an electronic switch connected to said input connection and to said sources of modulating voltage and positive bias potential, said electronic switch automatically effecting connection of said source of modulating voltage to said intput connection when said source of modulating voltage is more positive than said source of positive bias potential and automatically effecting disconnection of said source of modulating voltage from said input connection and simultaneously effecting connection of said source of positive bias potential thereto when said source of modulating voltage is less positive than said source of positive bias potential, resistance means approximating the resistance of the input connection of said amplifier stage, and means connecting said resistance means to said source of modulating voltage to impose a load on said source of modulating voltage when said source of modulating voltage is disconnected from said input connection.

2. An A. M. modulation circuit as set forth in claim 1 wherein the means connecting the resistance means to the source of modulating voltage comprises an electronic switch automatically effecting connection of the modulating voltage to the resistance means when said modulating voltage is above a predetermined level, and automatically effecting disconnection when the modulating voltage is below said predetermined level.

3. An A. M. modulation circuit comprising a carrier amplifier stage having an input connection for a modulating voltage, a source of alternate relatively positive and negative modulating voltage, a predetermined D. C. potential source, means connecting said foregoing sources for superimposing the modulating voltage on the D. C. potential, a source of positive bias potential, an electronic switch connected to said input connection and to said superimposing means and to said source of positive bias potential, said electronic switch automatically effecting connection of said superimposing means to said input connection when the superimposed voltage is more positive than said source of positive bias potential and automatically effecting disconnection of said superimposing means from said input connection and simultaneously effecting connection of said source of positive bias potential thereto when said superimposed voltage is less positive than said source of holding voltage, resistance means approximating the resistance of the input connection of said amplifier stage, and means connecting said resistance means to said source of modulating voltage to impose a load on said source of modulating voltage when said source of modulating voltage is disconnected from said input connection.

4. An A. M. modulation circuit as set forth in claim 3 and further including means for adjustably predetermining the potential of said D. C. potential source.

5. An A. M. modulation circuit as set forth in claim 3 wherein the predetermined D. C. potential source is at ground potential.

6. An A. M. modulation circuit comprising a carrier amplifier stage having an input connection for a modulating voltage, a source of alternate relatively positive and negative modulating voltage, a source of positive bias potential, means for varying the potential of said positive bias potential, an electronic switch connected to said input connection and to said sources of modulating voltage and positive bias potential, said electronic switch automatically effecting connection of said source of modulating voltage to said input connection when said source of modulating voltage is more positive than said source of positive bias potential and automatically effecting disconnection of said source of modulating voltage from said input connection and simultaneously effecting connection of said source of positive bias potential thereto when said source of modulating voltage is less positive than said source of positive bias potential, resistance means approximating the resistance of the input connection of said amplifier stage, and means connecting said resistance means to said source of modulating voltage to impose a load on said source of modulating voltage when said source of modulating voltage is disconnected from said input connection.

7. An A. M. modulation circuit comprising a carrier amplifier stage having an input connection for a modulating voltage, a modulation transformer having input and output windings, said output winding providing an alternate relatively positive and negative modulating voltage when a modulation voltage is applied to the input winding, a source of D. C. potential, means connecting one end of the output winding to said source of D. C. potential, a source of positive bias potential, an electronic switch including a pair of rectifiers each having an anode and a cathode, means connecting the anode of one of said rectifiers to the other end of said output winding, means for connecting the anode of the second rectifier to the source of positive bias potential, means connecting the cathodes of said rectifiers in parallel to said input connection whereby said electronic switch automatically effects connection of said output winding to said input connection when the modulating voltage superimposed on the D. C. potential is more positive than said source of positive bias potential and automatically effecting disconnection of said output winding from said input connection and simultaneously effecting connection of said source of positive bias potential to said input connection when said modulating voltage superimposed on said D. C. potential source is less than said source of positive bias potential, resistance means approximating the resistance of said input connection, and a rectifier connected between said resistance means and said other end of said output winding, said rectifier automatically effecting connection of said resistance means to said output winding when said input connection is disconnected therefrom, and effecting disconnection of said resistance means from said output winding when said input connection is connected to said output winding.

8. An A. M. modulation circuit comprising an amplifier stage having an input connection for a modulating voltage having alternate relatively positive and negative half cycles of equal predetermined maximum positive and negative values, means for reproducing the negative half cycles with maximum amplitudes less than said predetermined maximum values, and means comprising an electronic switch for alternately connecting said source and said reproducing means to said input connection, said electronic switch including a pair of rectifying devices each having an anode and a cathode, means connecting said cathodes in parallel to said input connection, means connecting one of said anodes to said source, and means connecting the other of said anodes to said reproducing means.

References Cited in the file of this patent

UNITED STATES PATENTS

| | | |
|---|---|---|
| 2,298,083 | Fyler | Oct. 6, 1942 |
| 2,493,484 | Franklin | Jan. 3, 1950 |